United States Patent
Moglia et al.

(10) Patent No.: US 11,708,501 B2
(45) Date of Patent: Jul. 25, 2023

(54) AQUEOUS IONOMERIC DISPERSIONS, AND METHODS THEREOF

(71) Applicant: Dow Global Technologies LLC, Midland, MI (US)

(72) Inventors: Robert S. Moglia, Midland, MI (US); Stacey A. Saba, Eagleville, PA (US); Hari Katepalli, Midland, MI (US); Matthew J. Crimmins, Midland, MI (US); Jessica Ye Huang, Sugarland, TX (US); James Richard De Garavilla, Silsbee, TX (US); Richard Tien Hua Chou, Hockessin, DE (US); Barry Alan Morris, Wilmington, DE (US); Daniel L. Dermody, Midland, MI (US); Kyle Anderson, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 199 days.

(21) Appl. No.: 17/295,659

(22) PCT Filed: Dec. 17, 2019

(86) PCT No.: PCT/US2019/066892
§ 371 (c)(1),
(2) Date: May 20, 2021

(87) PCT Pub. No.: WO2020/131898
PCT Pub. Date: Jun. 25, 2020

(65) Prior Publication Data
US 2021/0395540 A1  Dec. 23, 2021

Related U.S. Application Data (60) Provisional application No. 62/782,459, filed on Dec. 20, 2018.

(51) Int. Cl.
| | | |
|---|---|---|
| *C09D 7/45* | (2018.01) | |
| *C09D 7/65* | (2018.01) | |
| *C09D 123/08* | (2006.01) | |
| *C09D 123/12* | (2006.01) | |

(52) U.S. Cl.
CPC ............. *C09D 7/45* (2018.01); *C09D 7/65* (2018.01); *C09D 123/0815* (2013.01); *C09D 123/12* (2013.01)

(58) Field of Classification Search
CPC .......... C09D 7/45; C09D 7/65; C09D 123/12; C09D 123/0815
USPC .......................................................... 524/501
See application file for complete search history.

(56) References Cited

U.S. PATENT DOCUMENTS

| | | |
|---|---|---|
| 3,404,134 A | 10/1968 | Watkin |
| 5,028,674 A | 7/1991 | Hatch et al. |
| 5,330,788 A | 7/1994 | Roberts |
| 5,419,960 A | 5/1995 | Touhsaent |
| 5,542,677 A | 8/1996 | Sullivan et al. |
| 6,162,852 A | 12/2000 | Honeycutt et al. |
| 6,500,888 B2 | 12/2002 | Baumgartner et al. |
| 6,518,365 B1 | 2/2003 | Powell et al. |
| 6,680,082 B2 | 1/2004 | Chou et al. |
| 7,498,282 B2 | 3/2009 | Patel et al. |
| 8,779,053 B2 | 7/2014 | Lundgard et al. |
| 8,852,836 B2 | 10/2014 | Seki et al. |
| 8,907,022 B2 | 12/2014 | Hayes et al. |
| 2011/0033700 A1 | 2/2011 | Caylus |
| 2013/0172488 A1 | 7/2013 | Chou et al. |
| 2014/0357779 A1 | 12/2014 | Hayes |
| 2015/0203615 A1 | 7/2015 | Hayes |
| 2015/0203704 A1 | 7/2015 | Hayes |
| 2015/0251384 A1 | 9/2015 | Bennison et al. |
| 2015/0255653 A1 | 9/2015 | Samuels et al. |
| 2015/0267033 A1 | 9/2015 | Cohen et al. |
| 2015/0274951 A1 | 10/2015 | Hausmann et al. |
| 2016/0370720 A1 | 12/2016 | Yamashita et al. |

FOREIGN PATENT DOCUMENTS

| | | |
|---|---|---|
| GB | 1243303 A | 8/1971 |
| GB | 1485777 A | 9/1977 |
| WO | 9315143 A1 | 8/1993 |

OTHER PUBLICATIONS

PCT/US2019/066892, International Search Report and Written Opinion dated Jun. 8, 2020.
PCT/US2019/066892, International Preliminary Report on Patentability dated Jun. 16, 2021.

*Primary Examiner* — Hui H Chin

(57) ABSTRACT

An aqueous ionomer dispersion, and method of manufacturing thereof, comprising an ionomer composition and water, wherein the ionomer composition comprises: a) at least 20 wt. %, based on the total weight percent of the ionomer composition, of an ionomer; and b) up to 80 wt. %, based on the total weight percent of the ionomer composition, of a polyolefin.

19 Claims, 3 Drawing Sheets

FIG. 1A

A) "Zero" Static Charge Measurement

FIG. 1B

B) Mechanical Static Charge Transfer

FIG. 1C

C) Static Charge Measurement

FIG. 2A

A) "Zero" Static Charge

FIG. 2B

B) Mechanical Static Charge Transfer

FIG. 2C

C) "Dirt" Addition

AQUEOUS IONOMERIC DISPERSIONS, AND METHODS THEREOF

TECHNICAL FIELD

Embodiments described herein relate generally to aqueous dispersions of ionomers and to methods to form aqueous dispersions of ionomers. More particularly, embodiments of aqueous dispersions described herein may be used to coat a substrate.

BACKGROUND

Ionomers may be made by reacting metal salts with poly(ethylene (meth)acrylic acid) copolymers (base resin). Ionomers neutralized with multivalent cations, such as divalent and trivalent cations, have not been found to be easy to disperse in water due to the multivalent cation's tendency to form polymeric crosslinks. On the other hand, ionomers neutralized with monovalent salts of potassium, sodium, or volatile bases, such as, ammonia have also been difficult to disperse in water due to their increased melt viscosity and hydrophobicity.

Accordingly, it is desirable to have alternative ionomer compositions that more readily form aqueous dispersions of ionomers.

SUMMARY

Disclosed in embodiments herein are aqueous ionomer dispersions. The aqueous ionomer dispersions comprise an ionomer composition and water, wherein the ionomer composition comprises: a) at least 20 wt. %, based on the total weight percent of the ionomer composition, of an ionomer, wherein the ionomer is an ethylene acid copolymer that is at least partially neutralized, wherein the ethylene acid copolymer is the polymerized reaction product of: from 70 to 85 wt. % of ethylene; and from 15 to 30 wt. % of a monocarboxylic acid, based on the total weight of monomers present in the ethylene acid copolymer; wherein at least 70 mole % of total acid units of the ethylene acid copolymer are neutralized, with from 15 mole % to 50 mole % of total acid units of the ethylene acid copolymer being neutralized with a zinc cation and at least 40 mole % of total acid units of the ethylene acid copolymer being neutralized with a monovalent cation; and b) up to 80 wt. %, based on the total weight percent of the ionomer composition, of a polyolefin.

Also disclosed in embodiments herein are methods of manufacturing an aqueous ionomer dispersion. The methods comprise providing an ionomer composition, wherein the ionomer composition comprises: a) at least 20 wt. %, based on the total weight percent of the ionomer composition, of an ionomer, wherein the ionomer is an ethylene acid copolymer that is at least partially neutralized, wherein the ethylene acid copolymer is the polymerized reaction product of: from 70 to 85 wt. % of ethylene; and from 15 to 30 wt. % of a monocarboxylic acid, based on the total weight of monomers present in the ethylene acid copolymer; wherein from 15 mole % to 50 mole % of total acid units of the ethylene acid copolymer are neutralized with a zinc cation; and b) up to 80 wt. %, based on the total weight percent of the ionomer composition, of a polyolefin; and mixing the ionomer composition with an aqueous composition comprising water and a monovalent cation to form an aqueous ionomer dispersion, wherein the ionomer in the aqueous ionomer dispersion has at least 70 mole % of total acid units of the ethylene acid copolymer neutralized, and at least 40 mole % of total acid units of the ethylene acid copolymer are neutralized with a monovalent cation.

Further disclosed in embodiments herein are methods of forming a coated article. The methods comprise, coating the aqueous ionomer dispersion as described in one or more embodiments herein onto a substrate to form a coated substrate; and drying the coated substrate to form a coated article. A coated article as formed by the method described herein.

Even further disclosed in embodiments herein are coated articles. The coated articles may comprise a substrate and an ionomer composition coated onto the substrate.

In one or more embodiments herein, the aqueous ionomer dispersion comprises 10 to 60 wt. % of the ionomer composition. In one or more embodiments herein, the ethylene acid copolymer is the polymerized reaction product of from 75 to 85 wt. % of ethylene and from 15 to 25 wt. % of the monocarboxylic acid, based on the total weight of monomers present in the ethylene acid copolymer. In one or more embodiments herein, from 20 mole % to 50 mole % of total acid units of the ethylene acid copolymer are neutralized with a zinc cation. In one or more embodiments herein, the ionomer composition comprises 10 to 80 wt. % of the polyolefin. In one or more embodiments herein, the polyolefin is selected from the group consisting of polyethylene or polypropylene. In one or more embodiments herein, the polyolefin is an ethylene/alpha-olefin interpolymer having a melt index, I2, as determined according to ASTM D1238 (at 190° C. 2.16 kg), of 0.1 to 100.0 g/10 min.

In some embodiments herein, the ionomer composition is formed by: providing the ethylene acid copolymer and neutralizing from 15 mole % to 50 mole % of total acid units of the ethylene acid copolymer with the zinc cation to form an ionomer; and combining the ionomer with the polyolefin to form the ionomer composition. In other embodiments herein, the ionomer composition is formed by: combining the ethylene acid copolymer with the polyolefin to form a blend; and adding the zinc cation to the blend in an amount sufficient to neutralize from 15 mole % to 50 mole % of the total acid units of the ethylene acid copolymer to form the ionomer composition. In one or more embodiments herein, the mixing takes place at a temperature of from 100 Celsius to 300 Celsius.

Additional features and advantages of the embodiments will be set forth in the detailed description which follows, and in part will be readily apparent to those skilled in the art from that description or recognized by practicing the embodiments described herein, including the detailed description. It is to be understood that both the foregoing and the following description describes various embodiments and are intended to provide an overview or framework for understanding the nature and character of the claimed subject matter.

BRIEF DESCRIPTION OF THE DRAWINGS

The following detailed description of specific embodiments of the present disclosure can be best understood when read in conjunction with the following drawings, where like structure is indicated with like reference numerals.

DETAILED DESCRIPTION

Reference will now be made in detail to embodiments of aqueous ionomer dispersions and methods of manufacturing aqueous ionomer dispersions. The aqueous ionomer dispersion may be used to coat substrates, such as, flooring, plastic parts, wood, textiles, metal, ceramic, fibers, glass, or paper. It is noted however, that this is merely an illustrative implementation of the embodiments disclosed herein. The embodiments are applicable to other technologies that are susceptible to similar problems as those discussed above. For example, the aqueous ionomer dispersions described herein may be used in as additives in paints (or other coatings), concretes/cements, paper, plastics, composites, electrodes, adhesives and as an adhesive, or as a binder (asphalt, bitumen, paper, textiles, plastics).

In embodiments herein, the aqueous ionomer dispersion comprise an ionomer composition and water. In some embodiments, the aqueous ionomer dispersions comprise 10 wt. % to 60 wt. % of the ionomer composition. All individual values and subranges of 10 wt. % to 60 wt. % are included and disclosed herein. For example, in some embodiments, the aqueous ionomer dispersion comprises 10 wt. % to 55 wt. %, 15 wt. % to 55 wt. %, 15 wt. % to 50 wt. %, or 15 wt. % to 45 wt. % of the ionomer composition. In embodiments herein, the aqueous ionomer dispersion may also comprise 40 wt. % to 90 wt. % of water. All individual values and subranges of 40 wt. % to 90 wt. % of water are included and disclosed herein. For example, in some embodiments, the aqueous ionomer dispersion comprises 45 wt. % to 90 wt. %, 45 wt. % to 85 wt. %, 50 wt. % to 85 wt. %, or 55 wt. % to 85 wt. % of water.

The aqueous ionomer dispersions described herein have particles dispersed in an aqueous solution. The particles present in the aqueous ionomer dispersion may have a mean particle size of less than or equal to 4 µm. All individual values and subranges are included and disclosed herein. For examples, the aqueous ionomer dispersion may have a mean particle size of less than or equal to 3.5 µm, less than or equal to 3.0 µm, from 0.1 to 4 µm, from 0.1 to 3.5 µm, or from 0.1 to 3.0 µm. The aqueous dispersion described herein may also have a total resin solids content of from 10 to 60 wt. %, from 15 to 60 wt. %, from 20 to 60 wt. %, from 25 to 60 wt. %, or from 30 to 60 wt. %.

Ionomer Composition

The ionomer composition comprises an ionomer and a polyolefin. In embodiments herein, the ionomer composition comprises at least 20 wt. %, based on the total weight percent of the ionomer composition, of an ionomer and up to 80 wt. %, based on the total weight percent of the ionomer composition, of a polyolefin. All individual values and subranges are included and disclosed herein. For example, in some embodiments, the ionomer composition comprises from 20 wt. % to 90 wt. %, (alternatively, from 20 wt. % to 85 wt. %, from 20 wt. % to 80 wt. %, or from 20 wt. % to 60 wt. %) of the ionomer, and from 10 wt. % to 80 wt. % (alternatively, from 15 wt. % to 80 wt. %, from 20 wt. % to 80 wt. %, or from 40 wt. % to 80 wt. %) of the polyolefin.

The ionomer composition, the ionomer, and/or the polyolefin may also contain other additives known in the art. Exemplary additives may include, but are not limited to, processing aids, flow enhancing additives, lubricants, pigments, dyes, flame retardants, impact modifiers, nucleating agents, anti-blocking agents such as silica, thermal stabilizers, UV absorbers, UV stabilizers, surfactants, chelating agents, and coupling agents. Additives can be used in amounts ranging from about 0.01 wt. % to about 10 wt. %, based on the weight of the materials in the ionomer composition, ionomer, or polyolefin.

Ionomer

The ionomer is an ethylene acid copolymer that is at least partially neutralized. The ethylene acid copolymer is the polymerized reaction product of from 70 to 85 wt. % of ethylene; and from 15 to 30 wt. % of a monocarboxylic acid, based on the total weight of monomers present in the ethylene acid copolymer. All individual values and subranges are included and disclosed herein. For example, in some embodiments, the ethylene acid copolymer is the polymerized reaction product of from 72 to 85 wt. % of ethylene; and from 15 to 28 wt. % of a monocarboxylic acid, based on the total weight of monomers present in the ethylene acid copolymer. In other embodiments, the ethylene acid copolymer is the polymerized reaction product of from 75 to 85 wt. % of ethylene; and from 15 to 25 wt. % of a monocarboxylic acid, based on the total weight of monomers present in the ethylene acid copolymer. The ethylene acid copolymer may be polymerized according to processes disclosed in U.S. Pat. Nos. 3,404,134; 5,028,674; 6,500,888; and 6,518,365. In some embodiments, blends of two or more ethylene acid copolymers may be used, provided that the aggregate components and properties of the blend fall within the limits described above for the ethylene acid copolymers. For example, two ethylene methacrylic acid copolymers may be used such that the total weight % of methacrylic acid is from 15 wt. % to 30 wt. % of the total polymeric material.

In referring to the total acid units neutralized, the calculation of percent neutralization is based on the number of acid units considered to be present, based on the known amount of moles of the monocarboxylic acid comonomer, and the number of metal equivalents added. In embodiments herein, at least 70 mole % of total acid units of the ethylene acid copolymer are neutralized to form the ionomer, with from 15 mole % to 50 mole % of total acid units of the ethylene acid copolymer are neutralized with a zinc cation, and at least 40 mole % of total acid units of the ethylene acid copolymer are neutralized with a monovalent cation. All individual values and subranges are included and disclosed herein. For example, in some embodiments, at least 70 mole % of total acid units (alternatively, at least 75 mole %, at least 80 mole %, or at least 85 mole %) of the ethylene acid copolymer are neutralized to form the ionomer, with from 15 mole % to 50 mole % (alternatively, 15 mole % to 45 mole %, 15 mole % to 40 mole %, 20 mole % to 50 mole %, 20 mole % to 45 mole %, or 20 mole % to 40 mole %) of total acid units of the ethylene acid copolymer are neutralized with a zinc cation, and at least 40 mole % (alternatively, at least 45 mole %, at least 50 mole %, from 40 mole % to 100 mole %, 40 mole % to 95 mole %, 40 mole % to 85 mole %, or 40 mole % to 80 mole %) of total acid units of the ethylene acid copolymer are neutralized with a monovalent cation. The ethylene acid copolymer may be neutralized using methods disclosed in, for example, U.S. Pat. No. 3,404,134. In other embodiments, at least 70 mole % of total acid units (alternatively, at least 75 mole %) of the ethylene acid copolymer are neutralized to form the ionomer, with from 15 mole % to 50 mole % (alternatively, 20 mole % to 50 mole % or 20 mole % to 45 mole %) of total acid units of the ethylene acid copolymer are neutralized with a zinc cation, and at least 40 mole % (alternatively, at least 45 mole %, at least 50 mole %, from 40 mole % to 100 mole %, 40 mole % to 95 mole %, 40 mole % to 85 mole %, or 40 mole % to 80 mole %) of total acid units of the ethylene acid copolymer are neutralized with a monovalent cation.

Exemplary monovalent cations may include, but are not limited to, sodium, potassium, lithium, amines (such as, dimethyl ethanol amine (DMEA), triethyl amine, ammonia, etc.), or combinations thereof. In some embodiments herein, the monovalent cation is selected from the group consisting of sodium, potassium, lithium, ammonia, or combinations thereof. In one or more embodiments herein, the monovalent cation is sodium, potassium, ammonia, or combinations thereof.

In some embodiments herein, the ionomer may have a melt index (I2) from 1 to 100 g/10 min. All individual values and subranges are included and disclosed herein. For example, in some embodiments, the ionomer may have a melt index (I2) from 1 to 75 g/10 min or 1 to 50 g/10 min. I2 is measured according to ASTM D1238 at 190° C., 2.16 kg.

Polyolefin

As noted above, ionomer compositions described in embodiments herein comprises a polyolefin. The polyolefin may be selected from the group consisting of polyethylene or polypropylene. In some embodiments, the polyolefin is a polyethylene. The polyethylene is the reaction product of ethylene and, optionally, one or more alpha-olefin comonomers. In other embodiments, the polyolefin is an ethylene/alpha-olefin interpolymer. As used herein, the term "ethylene/alpha-olefin interpolymer" refers to the reaction product of ethylene and one or more alpha-olefin comonomers.

The ethylene/alpha-olefin interpolymer comprises (a) greater than or equal to 55%, for example, greater than or equal to 60%, greater than or equal to 65%, greater than or equal to 70%, greater than or equal to 75%, greater than or equal to 80%, greater than or equal to 85%, greater than or equal to 90%, greater than or equal to 92%, greater than or equal to 95%, greater than or equal to 97%, greater than or equal to 98%, greater than or equal to 99%, greater than or equal to 99.5%, from greater than 50% to 99%, from greater than 50% to 97%, from greater than 50% to 94%, from greater than 50% to 90%, from 70% to 99.5%, from 70% to 99%, from 70% to 97% from 70% to 94%, from 80% to 99.5%, from 80% to 99%, from 80% to 97%, from 80% to 94%, from 80% to 90%, from 85% to 99.5%, from 85% to 99%, from 85% to 97%, from 88% to 99.9%, 88% to 99.7%, from 88% to 99.5%, from 88% to 99%, from 88% to 98%, from 88% to 97%, from 88% to 95%, from 88% to 94%, from 90% to 99.9%, from 90% to 99.5% from 90% to 99%, from 90% to 97%, from 90% to 95%, from 93% to 99.9%, from 93% to 99.5% from 93% to 99%, or from 93% to 97%, by weight, of the units derived from ethylene; and (b) less than 30 percent, for example, less than 25 percent, or less than 20 percent, less than 18%, less than 15%, less than 12%, less than 10%, less than 8%, less than 5%, less than 4%, less than 3%, less than 2%, less than 1%, from 0.1 to 20%, from 0.1 to 15%, 0.1 to 12%, 0.1 to 10%, 0.1 to 8%, 0.1 to 5%, 0.1 to 3%, 0.1 to 2%, 0.5 to 12%, 0.5 to 10%, 0.5 to 8%, 0.5 to 5%, 0.5 to 3%, 0.5 to 2.5%, 1 to 10%, 1 to 8%, 1 to 5%, 1 to 3%, 2 to 10%, 2 to 8%, 2 to 5%, 3.5 to 12%, 3.5 to 10%, 3.5 to 8%, 3.5% to 7%, or 4 to 12%, 4 to 10%, 4 to 8%, or 4 to 7%, by weight, of units derived from one or more alpha-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Suitable alpha-olefin comonomers typically have no more than 20 carbon atoms. The one or more alpha-olefins may be selected from the group consisting of C3-C20 acetylenically unsaturated monomers and C4-C18 diolefins. For example, in some embodiments, the alpha-olefin comonomers may have 3 to 10 carbon atoms or 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The one or more alpha-olefin comonomers may, for example, be selected from the group consisting of propylene, 1-butene, 1-hexene, and 1-octene; or in the alternative, from the group consisting of 1-butene, 1-hexene and 1-octene.

In some embodiments described herein, the ethylene/alpha-olefin interpolymer may have a density of 0.850 g/cc to 0.910 g/cc. All individual values and subranges of at least 0.850 g/cc to 0.910 g/cc are included and disclosed herein. For example, in some embodiments, the ethylene/alpha-olefin interpolymer may have a density of 0.855 to 0.905 g/cc, 0.855 to 0.900 g/cc, 0.855 to 0.900 g/cc, or 0.865 to 0.895 g/cc. Density may be measured in accordance with ASTM D792.

In addition to the density, the ethylene/alpha-olefin interpolymer may have a melt index, I2, of 0.1 g/10 min to 100.0 g/10 min. All individual values and subranges of 0.1 g/10 min to 100.0 g/10 min are included and disclosed herein. For example, in some embodiments, the ethylene/alpha-olefin interpolymer may have a melt index, I2, ranging from a lower limit of 0.1, 0.5, 1.0, 1.5, 2.5, or 5.0 to an upper limit of 100.0, 75.0, 50.0, 35.0, 25.0, or 20.0 g/10 min. In other embodiments, the ethylene/alpha-olefin interpolymer may have a melt index, I2, of 0.5 g/10 min to 100.0 g/10 min, 1.0 g/10 min to 100.0 g/10 min, 2.0 g/10 min to 100.0 g/10 min, 5.0 g/10 min to 100.0 g/10 min, 1.0 g/10 min to 75.0 g/10 min, 5.0 g/10 min to 75.0 g/10 min, 1.0 g/10 min to 50.0 g/10 min., or 5.0 g/10 min to 50.0 g/10 min. Melt index, I2, may be measured in accordance with ASTM D1238 (190° C. and 2.16 kg).

Methods

Also provided herein are methods to manufacture an aqueous ionomer dispersion. The methods comprise providing an ionomer composition; and mixing the ionomer composition with an aqueous composition comprising water and a monovalent cation to form an aqueous ionomer dispersion. Mixing of the ionomer composition with the aqueous composition may take place at a temperature of from 100° C. to 300° C. The result may be a heated aqueous ionomer dispersion. A further, optional, step may include cooling the heated aqueous ionomer dispersion to a temperature of from 20 to 30° C., wherein the ionomer remains dispersed in the liquid phase. As used herein, "disperse," "dispersing" and related terms refer to solid articles, such as, pellets of polymer, are mixed with water and over a brief period of time disappear into the liquid phase.

Aspects of the amount of ionomer composition and water in the aqueous ionomer dispersion is previously described in embodiments herein. The ionomer composition comprises an ionomer and a polyolefin. The polyolefin is previously described in embodiments herein. The amounts of ionomer and polyolefin in the ionomer composition are also previously described in embodiments herein. The ionomer is an ethylene acid copolymer that is at least partially neutralized. The ethylene acid copolymer and neutralization of the ethylene acid copolymer are previously described in embodiments herein.

As previously noted, the ionomer composition is mixed with an aqueous composition comprising water and a monovalent cation to form an aqueous ionomer dispersion. In embodiments herein, the aqueous composition may comprise monovalent cation in an amount sufficient to neutralize the total acid units of the ethylene acid copolymer by monovalent cation.

In some embodiments herein, the ionomer composition is formed by providing the ethylene acid copolymer and neutralizing from 15 mole % to 50 mole % of total acid units of the ethylene acid copolymer with the zinc cation to form an ionomer; and combining the ionomer with the polyolefin to form the ionomer composition.

In some embodiments herein, the ionomer composition is formed by: combining the ethylene acid copolymer with the polyolefin to form a blend; and adding the zinc cation to the blend in an amount sufficient to neutralize from 15 mole % to 50 mole % of the total acid units of the ethylene acid copolymer to form the ionomer composition.

Uses

The aqueous dispersions described herein may be used to coat a substrate. Suitable substrates may include paperboard, cardboard, pulp-molded shape, woven fabric, nonwoven fabric, film, open-cell foam, closed-cell foam, or metallic foil. In some embodiments herein, a method for coating a substrate comprises: providing an aqueous ionomer dispersion as described in embodiments herein, applying the aqueous ionomer dispersion to the substrate to form a coated substrate. Applying may be performed by a dipping method, a spray method, a roll coating method, a doctor blade method, a flow coating method, or other suitable methods for applying liquid coatings that are known in the art. The method may further comprise a drying step.

In other embodiments herein, a method of forming a coated article comprises coating the aqueous ionomer dispersion as described in one or more embodiments herein onto a substrate to form a coated substrate; and drying the coated substrate to form a coated article.

The coated article comprises an ionomer composition layer as described herein formed on at least one surface of a substrate. The ionomer composition layer comprises an ionomer composition. The ionomer composition comprises a) at least 20 wt. %, based on the total weight percent of the ionomer composition, of an ionomer as described in embodiments herein, and b) up to 80 wt. %, based on the total weight percent of the ionomer composition, of a polyolefin as described in embodiments herein.

In embodiments herein, the coated article may exhibit improved static charge as compared to an uncoated article.

Test Methods

Density

Density can be measured in accordance with ASTM D-792 and reported in grams per cubic centimeter (g/cc).

Melt Index/Melt Flow Rate

For ethylene-based polymers, the melt index ($I_2$) is measured in accordance with ASTM D-1238, Procedure B (condition 190° C./2.16 kg) and reported in grams eluted per 10 minutes (g/10 min). For propylene-based polymers, the melt flow rate (MFR) is measured in accordance with ASTM D-1238, Procedure B (condition 230° C./2.16 kg) and reported in grams eluted per 10 minutes (g/10 min).

Mean Particle Size

Mean particle size is defined as the volume average particle diameter as measured with a Beckman Coulter LS 13-320 Laser Light Scattering Particle Sizer (Beckman Coulter Inc., Fullerton, Calif.) implementing an epoxy particle model (real fluid refractive index=1.332, real sample refractive index=1.5, imaginary sample refractive index=0). The samples are diluted into an aqueous KOH solution with pH>10 before measuring.

Dynamic Viscosity

Dynamic viscosity is measured via a Brookfield CAP 2000+ parallel plate viscometer equipped with Spindle 10. Approximately 0.5 mL of dispersion is loaded into the device and is measured at an appropriate rpm to obtain a steady viscosity value for 15 seconds before recording the dynamic viscosity.

Static Charge Measurements

Figure 1A:
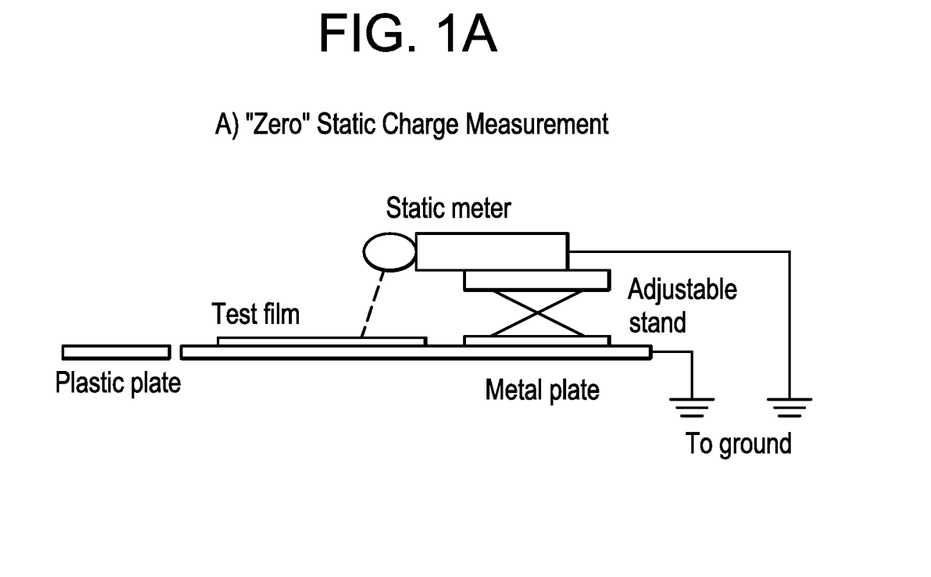
FIGS. 1A-1C graphically depict "zero" static charge measurement, mechanical static charge transfer, and static charge measurement for coated substrates in accordance with one or more embodiments of this disclosure.
Figure 1B:
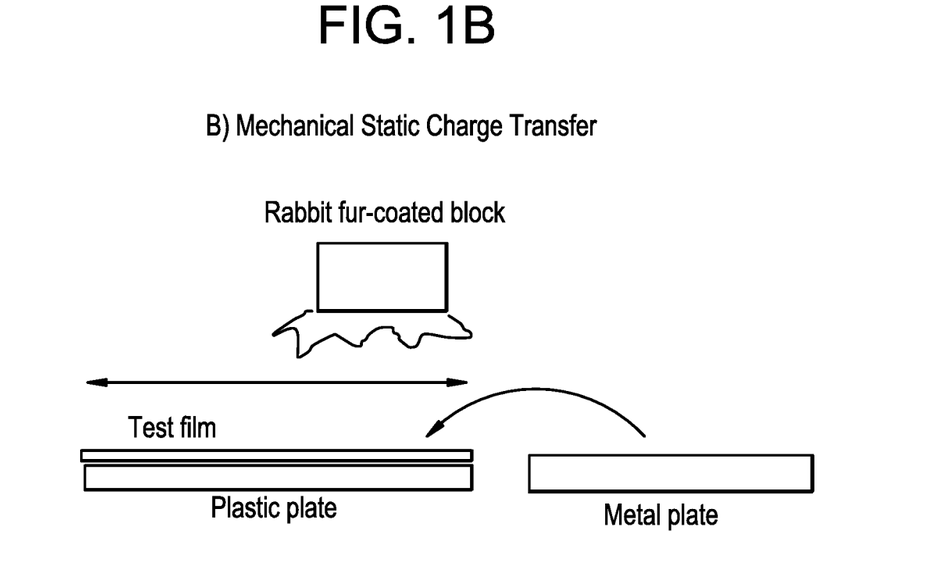
Figure 1C:
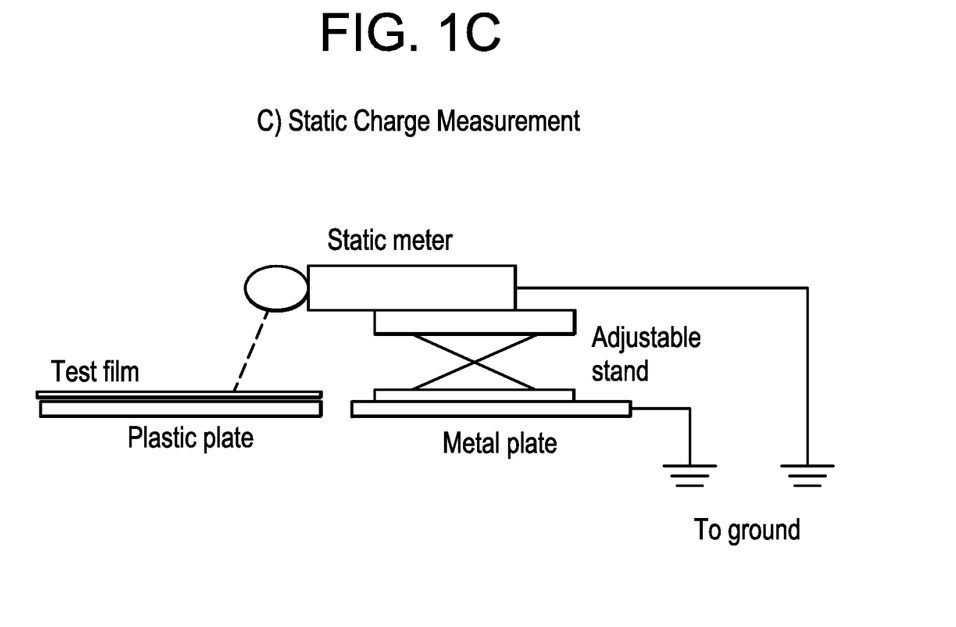

Static charge measurements are performed as seen in FIGS. 1A-1C. Referring to FIG. 1A, a Keyence SK-H050 electrostatic probe is affixed to an adjustable metal stand on a large metal plate and the temperature and % humidity in the lab is measured. Electrical leads are then attached to the meter and plate to electrically ground the system. The height of the probe is then adjusted to focus on the test swatch sample. Once the probe is focused, a "zero" static charge measurement is obtained. To induce static charge via the triboelectric effect, the test swatch is then transferred and affixed to a plastic plate and a plastic block covered with rabbit fur is rubbed over the test film with constant force for 15 strokes as seen in FIG. 1B. The fur coated block is then removed from the area and the static charge is quickly measured and recorded as seen in FIG. 1C. Once the initial static electricity measurement is complete, the test swatch is moved back to the grounded metal plate to discharge and the measurement process (A-C) are repeated 2-3 more times for each test swatch. The results are normalized to the swatch surface area and reported as $V/cm^2$ in Table 6.

Static Charge Powder Retention Measurements

Hershey's unsweetened cocoa powder is used as a dirt simulant for all static charge powder retention measurements. Coated polypropylene nonwoven fabric swatches are tested in a similar manner to the static charge measurements, lab temperature and % humidity are measured and recorded.

Figure 2A:
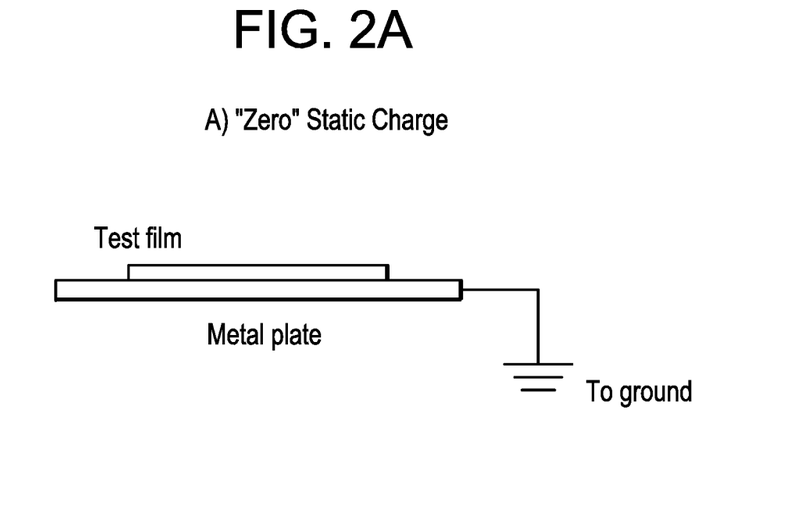
FIGS. 2A-2C graphically depict "zero" static charge measurement, mechanical static charge transfer, and dirt addition for coated substrates in accordance with one or more embodiments of this disclosure.
Figure 2B:
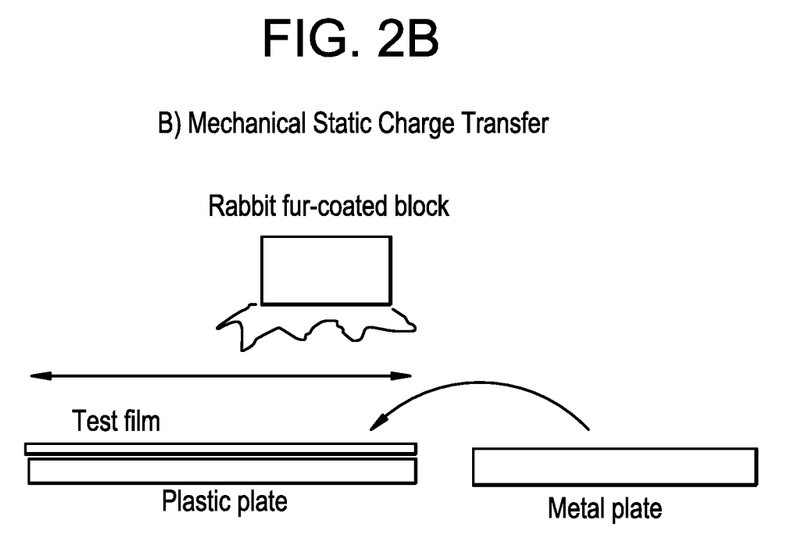
Figure 2C:
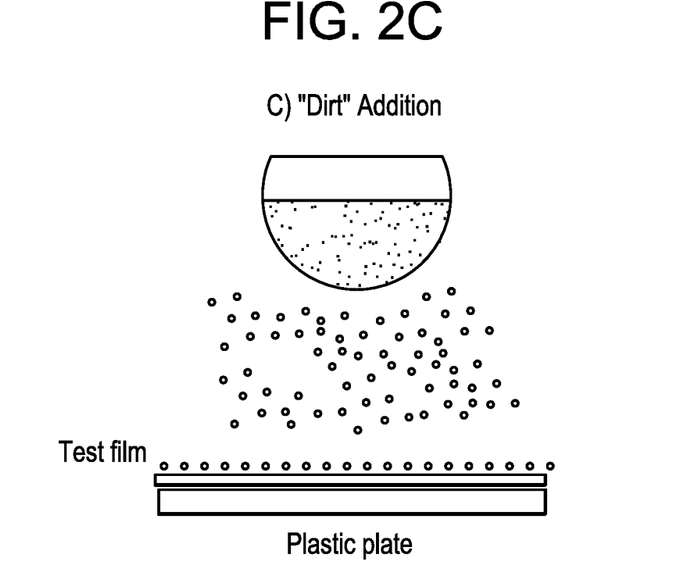

Static charge powder retention measurements are performed as seen in FIGS. 2A-2C. First, a test swatch is pre-weighed and placed on a grounded metal plate as seen in FIG. 2A. The swatch is then transferred and affixed to the plastic plate and a plastic block covered with rabbit fur is rubbed over the test swatch with constant force for 15 strokes to induce static charge as seen in FIG. 2B. A stainless steel mesh strainer, pre-filled with cocoa powder, is then shaken over the test film such that a fine powder layer covered the film uniformly as seen in FIG. 2C. Finally, the covered swatch is then removed from the plastic plate, held vertically, and mechanically shaken 9, 15 and 30 times and re-weighed to determine powder retention. The results are summarized in Table 6.

EXAMPLES

Polyolefin dispersions as outlined in Table 3 are prepared utilizing a Berstorff (KraussMaffei) extruder (25 mm screw diameter, 48 L/D rotating at 450 rpm) according to the following procedure and conditions outlined in Table 4: the base polyolefin resin and ionomer surfactant, as described below in Tables 1 and 2, are supplied to the feed throat of the extruder via a Schenck Mechatron loss-in-weight feeder and a K-Tron pellet feeder, respectively. The polyolefin resin and ionomer surfactant are melt blended and then emulsified in the presence of an initial aqueous stream to form an emulsion phase. The initial aqueous stream comprises water plus a monovalent cation solution. The monovalent cation solution may be a solution of 30 wt. % potassium hydroxide, a solution of 50 wt % of sodium hydroxide, or a 100 wt. % solution of dimethyl ethanol amine (DMEA). The emulsion phase is then conveyed forward to the dilution and cooling zone of the extruder where additional dilution water is added to form the aqueous dispersions having a solids level as outlined in Table 3. The barrel temperature of the extruder is set to 150° C., with the exception of the first two barrel segments which were set to 25 and 90° C. respectively. After the dispersion exited the extruder, it is further cooled and then filtered via a 200 μm mesh size bag filter.

Materials that did not form dispersions at the temperature indicated are denoted as "No" and those that did form dispersions at the temperature indicated are denoted as "Yes" in Table 5 below. An "aqueous dispersion" is formed when (i) greater than 95% of the solids were converted into fine particles with diameters less than or equal to 4 μm; and (ii) the dispersion is stable such that a cloudy or milky liquid with virtually no visible solids at manufacturing temperature, did not exhibit any visual change after the initial cooling to room temperature.

The ionomer surfactants are summarized below in Table 1, and are prepared from an ethylene acid copolymer that is the polymerized reaction product of ethylene and methacrylic acid (MAA). The amounts of the MAA are shown in Table 1 below. Additional aspects of the ionomer are provided below.

TABLE 1

Ionomer Surfactants

| | % MAA | Ethylene Acid Copolymer Melt Index (I2) (g/10 min) | Zinc Cation Source | % Neutralization | Ionomer MI (I2) (g/10 min) |
|---|---|---|---|---|---|
| Ionomer 1 | 19.0 | 250 | Zinc Oxide | 20.2 | 45.9 |
| Ionomer 2 | 15.0 | 60 | Zinc Oxide | 22.0 | 14 |
| Ionomer 3 | 19.0 | 250 | Zinc Oxide | 39.0 | 5 |

TABLE 2

Polyolefin Characteristics

| Polymer | Description | Density (g/cc) | Melt Index (I2) or Melt Flow Rate (MFR) (g/10 min) |
|---|---|---|---|
| Poly 1 | ENGAGE ™ 8200, available from The Dow Chemical Company (Midland, MI) | a polyethylene that is an ethylene/alpha-olefin interpolymer. | 0.870 | 5.0 |
| Poly 2 | VERSIFY ™ 4301, available from The Dow Chemical Company (Midland, MI) | a polypropylene that is a propylene-based elastomer | 0.868 | 25 |

TABLE 3

Aqueous Ionomer Dispersions

| Example | Ionomer | Polyolefin | % Ionomer | % Polyolefin | Monovalent Cation | Monovalent Cation % Neutralization | Total % Neutralization |
|---|---|---|---|---|---|---|---|
| A | Ionomer 3 | Poly 1 | 40 | 60 | Potassium | 31% | 70% |
| B | Ionomer 3 | None | 100 | 0 | Sodium | 57% | 96% |
| 1 | Ionomer 2 | Poly 1 | 40 | 60 | Potassium | 85% | 107% |
| 2 | Ionomer 1 | Poly 1 | 30 | 70 | Potassium | 74% | 94% |
| 3 | Ionomer 1 | Poly 1 | 30 | 70 | Potassium | 61% | 81% |
| 4 | Ionomer 1 | Poly 1 | 30 | 70 | Potassium | 53% | 73% |
| 5 | Ionomer 1 | Poly 1 | 20 | 80 | Potassium | 66% | 86% |
| 6 | Ionomer 3 | Poly 1 | 40 | 60 | Potassium | 62% | 101% |
| 7 | Ionomer 3 | Poly 1 | 40 | 60 | Potassium | 52% | 91% |
| 8 | Ionomer 3 | Poly 1 | 40 | 60 | Sodium | 43% | 82% |
| 9 | Ionomer 3 | Poly 2 | 40 | 60 | Sodium | 51% | 90% |
| 10 | Ionomer 3 | Poly 1 | 40 | 60 | DMEA | 122% | 162% |

TABLE 4

Dispersion Process Feed Rates

| | Polymer (g/min) | Ionomer (g/min) | Base (g/min) | Initial Aqueous (g/min) | Dilution (g/min) |
|---|---|---|---|---|---|
| A | 45 | 30 | 3.0 | 22.5 | 110 |
| B | 0 | 75 | 5.0 | 60.0 | 265 |
| 1 | 45 | 30 | 6.6 | 26.6 | 100 |
| 2 | 53 | 23 | 5.5 | 21.0 | 91 |
| 3 | 53 | 23 | 4.5 | 21.8 | 95 |
| 4 | 53 | 23 | 3.9 | 18.3 | 95 |
| 5 | 61 | 15 | 3.2 | 12.9 | 97 |
| 6 | 45 | 30 | 6.0 | 20.6 | 110 |
| 7 | 45 | 30 | 5.0 | 14.9 | 95 |
| 8 | 45 | 30 | 1.5 | 18.5 | 95 |
| 9 | 45 | 30 | 1.8 | 28.0 | 90 |
| 10 | 45 | 30 | 8.4 | 12.4 | 95 |

TABLE 5

Aqueous Ionomer Dispersion Results

| Example | Dispersion Yes (Y)/ No (N) | % Solids | Mean Particle Size (μm) | pH | Dynamic Viscosity (cP) |
|---|---|---|---|---|---|
| A | N | NM* | NM* | NM* | NM* |
| B | Y | 21.0 | 0.17 | 11.0 | 214 |
| 1 | Y | 38.4 | 1.03 | 11.8 | 1250 |
| 2 | Y | 42.5 | 0.61 | 10.1 | 62 |
| 3 | Y | 42.0 | 1.45 | 9.61 | 50 |
| 4 | Y | 50.6 | 1.39 | 9.48 | 37 |
| 5 | Y | 44.9 | 0.83 | 9.91 | 28 |
| 6 | Y | 30.5 | 0.49 | 10.9 | 42 |
| 7 | Y | 42.7 | 0.47 | 9.8 | 76 |

TABLE 5-continued

Aqueous Ionomer Dispersion Results

| Example | Dispersion Yes (Y)/ No (N) | % Solids | Mean Particle Size (μm) | pH | Dynamic Viscosity (cP) |
|---|---|---|---|---|---|
| 8 | Y | 43.9 | 0.89 | 10.22 | 40 |
| 9 | Y | 42.0 | 2.8 | 10.6 | 71 |
| 10 | Y | 43.6 | 1.12 | 10.4 | 125 |

*NM = not measurable

Coated Article Preparation

Dispersion Examples B and 2 were diluted to 5% solids in a glass jar with deionized water. Polypropylene nonwoven fabric was cut into 3 inch by 5 inch swatches then fully submerged in the diluted dispersion and swirled gently for 10 seconds. The wet swatches were removed from the dispersion and laid flat to dry for 24 hr then submerged in the dispersion and air dried again. The swatches were annealed at 110° C. for 5 min in a forced air oven and stored in re-sealable plastic bags prior to testing for static charge and static charge powder retention.

TABLE 6

Static Charge Measurements - Static Charge and Static Charge Powder Retention Results

| Article | Description | Coat Weight, gsm | Static Charge, V/cm² | Static Charge Powder Retention, Grams of Powder Retained after "X" Shakes | | |
|---|---|---|---|---|---|---|
| | | | | X = 9 | X = 15 | X = 30 |
| A1 | Polypropylene nonwoven fabric (PPNW) | 0 | −13 | 0.18 | 0.13 | 0.06 |
| A2 | PPNW coated with Dispersion B | 18 | −21 | 0.20 | 0.17 | 0.11 |
| A3 | PPNW coated with Dispersion 2 | 13 | −23 | 0.25 | 0.22 | 0.14 |

As shown by the dispersion results in Tables 5 & 6, comparative Example A did not form an aqueous dispersion. Comparative example B formed a dispersion, but had lower solids content, lower static charge, and lower static charge powder retention. Inventive examples 1-10 all formed dispersions at solids content of greater than 30% solids. The inventive dispersions had greater than 95% of the solids were converted into fine particles with diameters less than or equal to 4 μm. Also, the dispersions were stable such that a cloudy or milky liquid with virtually no visible solids at manufacturing temperature, did not exhibit any visual change after the initial cooling to room temperature. Further, inventive example 2 exhibited a higher static charge and a higher static charge powder retention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. An aqueous ionomer dispersion comprising an ionomer composition and water, wherein the ionomer composition comprises:
   a) at least 20 wt. %, based on the total weight percent of the ionomer composition, of an ionomer, wherein the ionomer is an ethylene acid copolymer that is at least partially neutralized, wherein the ethylene acid copolymer is the polymerized reaction product of:
   from 70 to 85 wt. % of ethylene; and
   from 15 to 30 wt. % of a monocarboxylic acid, based on the total weight of monomers present in the ethylene acid copolymer;
   wherein at least 70 mole % of total acid units of the ethylene acid copolymer are neutralized, with from 15 mole % to 50 mole % of total acid units of the ethylene acid copolymer being neutralized with a zinc cation and at least 40 mole % of total acid units of the ethylene acid copolymer being neutralized with a monovalent cation; and
   b) up to 80 wt. %, based on the total weight percent of the ionomer composition, of a polyolefin.

2. The aqueous ionomer dispersion of claim 1, the aqueous ionomer dispersion comprises 10 to 60 wt. % of the ionomer composition.

3. The aqueous ionomer dispersion of claim 1, wherein the ethylene acid copolymer is the polymerized reaction product of from 75 to 85 wt. % of ethylene and from 15 to 25 wt. % of the monocarboxylic acid, based on the total weight of monomers present in the ethylene acid copolymer.

4. The aqueous ionomer dispersion of claim 1, wherein at least 70 mole % of total acid units of the ethylene acid copolymer are neutralized, with from 20 mole % to 50 mole % of total acid units of the ethylene acid copolymer are neutralized with a zinc cation and at least 40 mole % of total acid units of the ethylene acid copolymer being neutralized with a monovalent cation.

5. The aqueous ionomer dispersion of claim 1, wherein the ionomer composition comprises 10 to 80 wt. % of the polyolefin.

6. The aqueous ionomer dispersion of claim 1, wherein the polyolefin is selected from the group consisting of polyethylene or polypropylene.

7. The aqueous ionomer dispersion of claim 1, wherein the polyolefin is an ethylene/alpha-olefin interpolymer having a melt index, I2, as determined according to ASTM D1238 (at 190° C. 2.16 kg), of 0.1 to 100.0 g/10 min.

8. A method of manufacturing an aqueous ionomer dispersion, the method comprising:
providing an ionomer composition, wherein the ionomer composition comprises:
a) at least 20 wt. %, based on the total weight percent of the ionomer composition, of an ionomer, wherein the ionomer is an ethylene acid copolymer that is at least partially neutralized, wherein the ethylene acid copolymer is the polymerized reaction product of:
from 70 to 85 wt. % of ethylene; and
from 15 to 30 wt. % of a monocarboxylic acid, based on the total weight of monomers present in the ethylene acid copolymer;
wherein from 15 mole % to 50 mole % of total acid units of the ethylene acid copolymer are neutralized with a zinc cation; and
b) up to 80 wt. %, based on the total weight percent of the ionomer composition, of a polyolefin; and
mixing the ionomer composition with an aqueous composition comprising water and a monovalent cation to form an aqueous ionomer dispersion, wherein the ionomer in the aqueous ionomer dispersion has at least 70 mole % of total acid units of the ethylene acid copolymer neutralized, and at least 40 mole % of total acid units of the ethylene acid copolymer are neutralized with a monovalent cation.

9. The method of claim 8, wherein the ionomer composition is formed by:
providing the ethylene acid copolymer and neutralizing from 15 mole % to 50 mole % of total acid units of the ethylene acid copolymer with the zinc cation to form an ionomer; and
combining the ionomer with the polyolefin to form the ionomer composition.

10. The method of claim 8, wherein the ionomer composition is formed by:
combining the ethylene acid copolymer with the polyolefin to form a blend; and
adding the zinc cation to the blend in an amount sufficient to neutralize from 15 mole % to 50 mole % of the total acid units of the ethylene acid copolymer to form the ionomer composition.

11. The method of claim 8, wherein mixing takes place at a temperature of from 100 Celsius to 300 Celsius.

12. The method of claim 8, wherein the aqueous ionomer dispersion comprises 10 to 60 wt. % of the ionomer composition.

13. The method of claim 8, wherein the ethylene acid copolymer is the polymerized reaction product of from 75 to 85 wt. % of ethylene and from 15 to 25 wt. % of the monocarboxylic acid, based on the total weight of monomers present in the ethylene acid copolymer.

14. The method of claim 8, wherein from 20 mole % to 50 mole % of total acid units of the ethylene acid copolymer are neutralized with a zinc cation.

15. The method of claim 8, wherein the ionomer composition comprises 10 to 80 wt. % of the polyolefin.

16. The method of claim 8, wherein the polyolefin is selected from the group consisting of polyethylene or polypropylene.

17. The method of claim 8, wherein the polyolefin is an ethylene/alpha-olefin interpolymer having a melt index, I2, as determined according to ASTM D1238 (at 190° C. 2.16 kg), of 0.1 to 100.0 g/10 min.

18. A method of forming a coated article, the method comprising:
coating the aqueous ionomer dispersion of claim 1 onto a substrate to form a coated substrate; and
drying the coated substrate to form a coated article.

19. A coated article formed according to the method of claim 18.

* * * * *